United States Patent
Blance et al.

[15] 3,692,878
[45] Sept. 19, 1972

[54] NOVEL INTERPOLYMER BLENDS

[72] Inventors: Robert B. Blance, 26 Colony Dr., East Longmeadow, Mass. 01028; David R. Cahill, 52 Oakland St., Wilbraham, Mass. 01095; Peter Nachtel, 1234 Wilbraham, Springfield, Mass. 01119

[22] Filed: April 21, 1971

[21] Appl. No.: 136,207

Related U.S. Application Data

[62] Division of Ser. No. 783,700, Dec. 13, 1968, Pat. No. 3,607,376.

[52] U.S. Cl.......260/901, 117/155 UA, 117/161 UT, 260/41 B, 260/41 R, 260/33.6 UA
[51] Int. Cl..............................................C08f 41/12
[58] Field of Search.....................................260/901

[56] References Cited

UNITED STATES PATENTS

| | | | |
|---|---|---|---|
| 3,365,410 | 1/1968 | Wesslau et al. | 260/29.6 |
| 2,934,510 | 4/1960 | Crissey et al. | 260/31.8 |

*Primary Examiner*—Murray Tillman
*Assistant Examiner*—C. J. Seccuro

[57] ABSTRACT

Disclosed herein are polymer blends comprising a first interpolymer of a vinyl alcohol ester and at least one ethylenically unsaturated acid ester and a second interpolymer comprising a vinyl aromatic compound, at least one ethylenically unsaturated acid ester and at least one compound containing one or more acid groups. These blends are particularly useful as binders and adhesives.

4 Claims, No Drawings

NOVEL INTERPOLYMER BLENDS

This application is a divisional application of application Ser. No. 783,700 filed Dec. 13, 1968, now U.S. Pat. No. 3,607,376.

BACKGROUND OF THE INVENTION

1. Field of the Invention

This invention relates to novel blends of interpolymers which are useful as binders and adhesives. More particularly, this invention relates to blends of a first interpolymer comprising a vinyl alcohol ester and at least one ethylenically unsaturated acid ester and a second interpolymer comprising a vinyl aromatic compound, at least one ethylenically unsaturated acid ester and at least one ethylenically unsaturated compound containing at least one acid group.

2. Description of the Prior Art

Electrophotography relates to substrates having a photoconductive substance coated thereon which provides a surface upon which images are reproducible. The substrate may, for example, be paper, glass, metal foil, etc. The photoconductive substance is a material having electrical conductivity dependent upon the amount of light to which it is subjected. The photoconductive layer, although not light sensitive per se, is rendered so by applying to the coated article an electrostatic charge (e.g., by Corona discharge). Images to be reproduced are placed on top of the charged surface which is exposed to illumination by conventional photographic methods, whereby the coating locally dissipates its charge in proportion to the intensity of illumination. Non-illuminated areas, which retain their charge, are then treated with electroscopic powder (e.g., colored synthetic resins) resulting in a visible image which may be transferred to another surface or may be fixed, e.g., by fusing, rendering the powder permanently adherent to the coating substrate.

Fundamentally, then, electrophotographic coatings comprise a photoconductor such as, for example, zinc oxide, which is bonded by an organic resin to a base sheet or other substrate. It is known that copolymers of vinyl acetate and copolymers of styrene are individually effective as binders. Coatings based upon vinyl acetate copolymers, however, have been found to be deficient in speed. Further, coatings of copolymers of styrene have been found to be low in charge acceptance and yield copies of poor image density. Both deficiencies of the separate copolymers may be overcome, at least in part, by blending the two types of copolymers. The major drawback of such blends, however, has been their incompatibility as exhibited by their rapid phase separation. Such separation is a serious drawback to commercial utilization. It might be expected that compatible blends useful in this area could be achieved by the mere matching of solubility parameters. Attempts to achieve this, however, have been unsuccessful. It is necessary for commercial utility that the blended resins be compatible in solution concentrations of at least 20 percent by weight. Imposed upon this requirement for compatibility, however, is, of course, the requirement that the blend employed adhere to the particular photoconductive element being used in the system and to the substrate as well. In addition, the binder employed must enhance the photoconductive properties of the system.

SUMMARY OF THE INVENTION

This invention relates to a composition of matter comprising a first interpolymer of at least one vinyl alcohol ester and at least one ethylenically unsaturated acid ester and a second interpolymer comprising at least one vinyl aromatic compound, at least one ethylenically unsaturated acid and at least one ethylenically unsaturated compound containing at least one acid group.

More particularly, this invention relates to a composition of matter comprising a blend of:

A. a first interpolymer comprising at least one vinyl alcohol ester and at least one ethylenically unsaturated acid ester containing at least seven carbon atoms and B. a second interpolymer comprising
1. at least one vinyl aromatic compound,
2. at least one ethylenically unsaturated acid ester, and
3. 0.5 percent to 5.0 percent by weight, based upon the total weight of the second interpolymer, of at least one ethylenically unsaturated compound containing at least one acid group.

This invention also relates to the use of such blends in various adhesive compositions wherein the term "adhesive" is construed as including binders.

DESCRIPTION OF THE PREFERRED EMBODIMENTS

The vinyl alcohol ester of the first interpolymer of the blends of this invention may be any vinyl alcohol ester which is copolymerizable with the ethylenically unsaturated acid ester containing at least 7 carbon atoms. The choice of the particular vinyl alcohol to be employed will generally depend upon the pigment which is to be included and the substrate to be coated. That is to say, the interpolymer produced should have the ability both to wet the pigment and to adhere to the substrate. Examples of such vinyl alcohol esters are vinyl formate, vinyl acetate, vinyl propionate, vinyl butyrate, vinyl pentanoate, vinyl hexanoate, vinyl heptanoate, vinyl octanoate, etc., their isomers and mixtures thereof. Where the compositions of this invention are to be used as binders in electrophotographic processes, it will usually be desirable that they be able to wet zinc oxide, a commonly used photoconductive pigment. Where this is the case it will generally be advantageous that a lower vinyl alcohol ester e.g. vinyl formate, vinyl acetate, vinyl propionate, vinyl butyrate, or isomers thereof be employed. Thus, these four vinyl alcohol esters are the preferred vinyl alcohol esters in the practice of this invention. Vinyl acetate is most preferred because of its ready commercial availability and favorable capacity for interpolymerization.

A second component of the first interpolymer of the blends of this invention is an ethylenically unsaturated acid ester containing at least seven carbon atoms. It is this component that is critical to the attainment of compatibility between the two interpolymers. Such esters may of course be prepared by the reaction of organic acids and alcohols. The acid moiety of such esters may be monocarboxylic, polycarboxylic, monosulfonic, or polysulfonic acids such as, for example, acrylic acid, methacrylic acid, maleic acid, fumaric acid, crotonic acid, vinyl sulfonic and the like. The alcohol moiety of the ester may be any alcohol containing sufficient carbon atoms to bring the total number of carbon atoms of the ester moiety to at least 7. Thus the alcoholic moiety may, for example, be methanol, ethanol, propanol, butanol, pentanol, hexanol, heptanol, octanol, etc., their isomers and mixtures thereof. Of those compounds which may be used as the second component of the first interpolymer, acrylic and methacrylic acid esters are preferred. In particular, it has been found that butyl acrylate provides optimal properties for electrophotographic coatings when interpolymerized with vinyl acetate and is thus the most preferred ester.

In addition to the two critical components of the first interpolymer described above, other monomers may be interpolymerized therewith to impart particular desirable qualities to the resin. In particular, it has been found beneficial and desirable in photoconductive electrophotographic applications that an ethylenically unsaturated acid ester containing four to six carbon atoms be included, for example, methyl acrylate, ethyl acrylate, propyl acrylate, methyl methacrylate, ethyl methacrylate, and the like. Other esters such as dimethyl maleate, dimethyl fumarate and the like may be employed.

The vinyl aromatic compound moiety of the second interpolymer is preferably styrene. However, ring-substituted styrenes in which the substituents are one to four carbon atoms alkyl groups or chlorine atoms may be employed. Examples of such ring-substituted styrenes include ortho-, meta- and para- methyl, ethyl, butyl, etc., mono-alkyl styrenes, 2,3-2,4-dimethyl and diethyl styrenes; mono-, di- and tri- chlorostyrenes; alkyl chlorostyrenes such as 2-methyl-4-chlorostyrene, etc. The use of two or more such styrene monomer moieties is also within the scope of this invention. The ethylenically unsaturated acid ester which constitutes a second component of the second interpolymer may be any alkyl ester of an ethylenically unsaturated monocarboxylic or polycarboxylic acid, e.g., methyl acrylate, methyl methacrylate, methyl crotonate, ethyl acrylate, ethyl methacrylate, ethyl crotonate, dimethyl maleate, dimethyl fumarate, diethyl maleate, dipropyl itaconate, butyl crotonate, and the like. The preferred ester is ethyl acrylate.

The second interpolymer further contains at least one ethylenically unsaturated compound containing at least one acid group. This acid group may be a carboxylic acid group or a sulfonic acid group. Examples of compounds which may be employed are acrylic acid, methacrylic acid, crotonic acid, maleic acid, fumaric acid; mono esters and partial mono esters of maleic acid, fumaric acid, itaconic acid, e.g., mono methyl maleate, monoethyl fumarate, etc.; vinyl sulfonic acid, styrene sulfonic acid, sulfoethyl methacrylate, sulfoethyl acrylate, sulfoethyl maleate, and the like.

Any of various pigments may be dispersed in the compositions of this invention so long as it has adhesive affinity for the particular composition employed. By "adhesive affinity" is meant that the composition will adhere to the pigment and act as a binder therefor. Exemplary of the many pigments which might be used are titanium dioxide, ferric oxide, graphite, lead oxide, lead chromate and the like. Where the compositions of this invention are to be used as binders in electrophotographic processes the pigment will be one capable of being rendered light sensitive by the application thereto of an electrostatic charge. As examples of such photoconductors may be listed antimony oxide, aluminum oxide, bismuth oxide, cadmium oxide, mercury oxide, molybdenum oxide, lead oxide, zinc iodide, cadmium iodide, cadmium sulfide, selenium metal, arsenic trisulfide, lead telluride and the like. In particular, zinc oxide is preferred for such application. Mixtures of two or more pigments may also be employed.

For such electrophotographic processes, various organic photoconductors may also be used either in addition to the inorganic, e.g. zinc oxide, or in place of them. Aromatic amines may, for example, be employed for this purpose. Among the many that may be used are 4,5-Diphenyl-2-imidazolone, 4,5-diphenylimidazole-2-thione and their derivatives, 1-phenyl-3,5-bis(p-methoxy-styryl)pyrazoline, polymers of N-vinyl carbozole, 4,4''-dibromoterphenyl, poly(9-vinyl anthracene), etc.

The following examples are presented in illustration of the invention but are not to be construed as limitations thereof. Where parts are mentioned, parts by weight are intended unless otherwise indicated.

EXAMPLE 1

PART A

Into a reaction vessel equipped with an agitator, a condenser, a thermometer and a metering pump for controlled, delayed monomer input is introduced 500 parts of vinyl acetate, 14 parts of ethyl acrylate, 14 parts of butyl acrylate, 140 parts toluene, 5 parts of benzoyl peroxide and 2 parts of t-butyl perbenzoate. The mixture is then heated to reflux. In a separate container is mixed 236 parts of ethyl acrylate, 236 parts of butyl acrylate and 200 parts of toluene. This mixture is then introduced into the reservoir supplying the metering pump and addition of the delay and monomer charge is begun. The delay is carried out over 4 – 40 minute periods. During the first 40 minute period 306 parts of the delayed monomer mixture is added, during the second 40 minute period 210 parts, during the third 40 minute period 107 parts and, finally, during the last 40 minute period the final 50 parts of delay is added. The batch is then held at reflux for an additional 4 hours. The solution is diluted with 230 parts of toluene and then cooled to room temperature. The resulting polymer containing solution has a total solids content of 67 percent and a Brookfield viscosity (No. 4 spindle at 12 r.p.m.) of 36,000.

PART B

Into a reaction vessel equipped as in Part A above is introduced 170 parts of styrene, 250 parts of ethyl acrylate, 200 parts of toluene, 1.0 part of acrylic acid and 4 parts of t-butyl perbenzoate. The batch is heated to reflux. A delay charge consisting of 75 parts of styrene, 175 parts of toluene and 4.0 parts acrylic acid is mixed in a separate vessel. The delay is added over a 4 hour period. During the first hour 136 parts of delay is added, during the second hour 67 parts, during the third hour 34 parts and, finally, during the fourth hour 17 parts. The batch is held at reflux for an additional 16 hours and then cooled to room temperature yielding a polymer solution having a total solids of 58.2 percent and a Brookfield viscosity (No. 4 spindle at 40 r.p.m.) of 7,100.

PART C

20 Parts of the 67 percent solids solution of Part A is mixed with 23 parts of the 58 percent solids solution of Part B and 5.7 parts of toluene is added thereto to yield a 55 percent solids solution of the blends. Visual examination shows that this solution blend is compatible.

PART D

68 Parts of the 55 percent solution prepared in Part C is weighed into a Waring Blender. 144 Parts of toluene is added and the new mixture is well agitated. Next is added 225 parts of a French process zinc oxide and agitation is continued at high speed for 7–10 minutes. 4.5 Parts of a ½ percent solution in methanol of a sensitizing dye is then added with thorough mixing. The dispersion thus prepared is applied to a commercially available conductive base-stock paper to a coating weight of 20 lbs. per ream. The coated paper is then dried and conditioned at 50 percent relative humidity in the dark and then tested for charge acceptance, dark decay charge and decay of charge during illumination using a Victoreen Model EPA-825 electrostatic paper analyzer. The procedure by which this is accomplished is set forth in RCA Review, Dec., 1961, Pages 780–790. For the coating prepared in this example a charge acceptance is 440 volts, the dark decay of charge is 7.5 volts per second and the decay of charge during illumination is 104 volts per second.

EXAMPLE 2

CONTROL

Example 1 is repeated using the interpolymer of Example 1, Part A and substituting for the interpolymer of Example 1, Part B an interpolymer containing no acrylic acid, i.e., 50/50 styrene/ethyl acrylate rather than 49/50/1 styrene/ethyl acrylate/acrylic acid. The blended resin solutions are incompatible and no coating is obtainable upon which to test the electric properties.

EXAMPLE 3

Example 1 is repeated substituting for the interpolymer of Part B an interpolymer of 49.5/50/0.5 styrene/ethyl acrylate/acrylic acid. Again, the blend is found to be compatible to toluene and the electrical properties are: charge acceptance, 425 volts; dark decay of charge, 10 volts per second; and decay of charge during illumination, 94 volts per second.

EXAMPLE 4

Example 1 is repeated substituting for the interpolymer of Part B an interpolymer of 45/50/5.0 styrene/ethyl acrylate/acrylic acid. This blend is compatible in a solution with toluene and n-propanol and the electrical properties are 515 volts charge acceptance, 5.0 volts per second dark decay and 135 volts per second illuminated decay.

EXAMPLE 5

Example 1 is repeated except that a 60/40 vinyl acetate/butyl acrylate copolymer is substituted for the 50/25/25 vinyl acetate/ethyl acrylate/butyl acrylate interpolymer employed therein. The blend is found to be compatible in toluene solution and the electrical properties are 441 volts charge acceptance, 7.0 volts per second dark decay and 86 volts per second illuminated decay.

EXAMPLE 6

CONTROL

Example 1 is repeated except that a copolymer of 70/30 vinyl acetate/methyl acrylate is substituted for the interpolymer of Part A. This time the blend is incompatible in toluene solution and the charge acceptance is only 166 volts. Dark decay is 5.0 volts per second and illuminated decay is 94 volts per second. This example demonstrates the deficiencies of a system not containing an ethylenically unsaturated acid ester containing at least seven carbon atoms as a part of the first interpolymer.

EXAMPLE 7

Into a reaction vessel is charged 180 parts styrene, 250 parts of ethyl acrylate and 1 part of 2-sulfoethyl methacrylate, 370 parts of toluene and 8 parts of t-butyl perbenzoate. An additional 65 parts of styrene and 4 parts of sulfoethyl methacrylate blended with 5 parts of toluene are added to the reaction in two separate streams over a 4 hour period while the batch is held at reflux. The reaction is maintained at reflux for an additional 20 hours and is cooled yielding a polymeric solution of 67.5 percent solids. The Brookfield viscosity is 1,600 centipoises (No. 3 spindle at 30 r.p.m.). The resulting interpolymer is then substituted for the interpolymer of Example 1, Part B and the final product is found to have a charge acceptance of 448 volts, a dark decay of 4.0 volts per second and an illuminated decay of 107 volts per second.

EXAMPLE 8

Example 1 is repeated except that an interpolymer of 47/50/3 chlorostyrene/ethyl acrylate/acrylic acid is substituted for the interpolymer of Part B. The blend is again found to be compatible in toluene and the electrical properties are 177 volts charge acceptance, 4.5 volts per second dark decay and 87 volts per second illuminated decay.

It will be noted that in the foregoing examples the first and second interpolymers have been blended in 1:1 ratios. It is not necessary to the practice of this invention that such be the case. The 1:1 ratio was chosen as being the most rigorous test of compatibility; that is to say, if compatibility can be shown at 1:1, it will also be achievable where one or the other of the components is present in major proportions. For particular applications as, for example, in electrophotography optimization of a particular system well may dictate variations in proportion as divergent as 9:1 or 1:9 or even beyond.

Further, it should be noted that although the examples show only application to paper substrates, they may also be successfully applied to metal, glass, ceramics and, in particular, wooden substrates. Thus, upon formulation with the various pigments, fillers, driers, extenders, dyes, etc., well known to those of skill in the art, paints and other coatings for application to a wide variety of surfaces may be produced.

Thus, it will be obvious that many variations and modifications may be applied to the invention described herein without departing from the scope thereof.

What is claimed is:

1. A composition of matter comprising a blend of:
   A. a first interpolymer consisting of an interpolymerization produce of at least one vinyl alcohol ester and at least one ester of acrylic acid containing at least seven carbon atoms and
   B. a second interpolymer consisting of an interpolymerization product of:
      1. at least one vinyl aromatic compound,
      2. at least one ester of acrylic acid and
      3. 0.5 to 5.0 percent by weight, based upon the total weight of the second interpolymer of at least one ethylenically unsaturated compound containing at least one acid group;

wherein the weight ratio of the first interpolymer to the second interpolymer is in the range from 9:1 to 1:9.

2. The composition of claim 1 wherein the first interpolymer comprises an interpolymerization product of:
   A. at least one vinyl alcohol ester,
   B. at least one ester of acrylic acid containing at least seven carbon atoms and
   C. at least one ester of acrylic acid containing four to six carbon atoms.

3. The composition of claim 1 dissolved in a compatible organic solvent.

4. The composition of claim 3 having dispersed therein at least one pigment having adhesive affinity for the interpolymer blend thereof.

* * * * *